United States Patent
Hanna et al.

(10) Patent No.: US 10,695,985 B2
(45) Date of Patent: Jun. 30, 2020

(54) METHOD FOR DESIGNING AND FITTING, VIA INTERFERENCE, AN INSERT INTO AN OPENING IN A NON-METALLIC MATERIAL

(71) Applicant: SHORT BROTHERS PLC, Belfast (GB)

(72) Inventors: Samuel Colin Hanna, Bangor (GB); Robert Samuel Wilson, Belfast (GB); William Christopher Campbell, Belfast (GB)

(73) Assignee: SHORT BROTHERS PLC, Belfast (GB)

( * ) Notice: Subject to any disclaimer, the term of this patent is extended or adjusted under 35 U.S.C. 154(b) by 78 days.

(21) Appl. No.: 15/758,801

(22) PCT Filed: Sep. 9, 2016

(86) PCT No.: PCT/GB2016/052787
§ 371 (c)(1),
(2) Date: Mar. 9, 2018

(87) PCT Pub. No.: WO2017/042573
PCT Pub. Date: Mar. 16, 2017

(65) Prior Publication Data
US 2019/0084247 A1    Mar. 21, 2019

(30) Foreign Application Priority Data
Sep. 10, 2015   (GB) .................................. 1516039.3

(51) Int. Cl.
*B29C 65/56*   (2006.01)
*B29C 65/14*   (2006.01)
(Continued)

(52) U.S. Cl.
CPC ............ *B29C 65/564* (2013.01); *B29C 35/16* (2013.01); *B29C 65/14* (2013.01); *B29C 65/66* (2013.01);
(Continued)

(58) Field of Classification Search
CPC ..... B29C 65/564; B29C 66/721; B29C 35/16; B29C 66/91413; B29C 66/7212;
(Continued)

(56) References Cited

U.S. PATENT DOCUMENTS 3,731,367 A   5/1973   Laussermair et al.
4,588,626 A   5/1986   Cologna et al.
(Continued)

FOREIGN PATENT DOCUMENTS

DE   3909560 A1   9/1990
EP   0095595 A1   12/1983
(Continued)

OTHER PUBLICATIONS

International Search Report and Written Opinion dated Nov. 18, 2016, for International Patent Application No. PCT/GB2016/052787.
(Continued)

*Primary Examiner* — Ryan J. Walters
(74) *Attorney, Agent, or Firm* — Karceski IP Law, PLLC

(57) ABSTRACT

A method for inserting an insert into a hole in a composite material made from a plurality of carbon fiber layers suspended in a resin material includes lowering a temperature of the insert to a reduced temperature at which a coefficient of thermal expansion of a material of the insert causes the insert to contract to a first perimeter, inserting the insert at the reduced temperature into the hole, and permitting the temperature of the insert to increase from the reduced temperature to an operational temperature. At the opera-
(Continued)

tional temperature, the insert expands to a second perimeter so that the insert is retained within the composite material due to an interference between the insert and the composite material. The interference transfers a structural load from the insert to the composite material and results in damage to the composite material if the insert is dislodged at the operational temperature.

16 Claims, 15 Drawing Sheets

(51) Int. Cl.
*B29C 65/66* (2006.01)
*B29C 65/00* (2006.01)
*F16B 4/00* (2006.01)
*B29C 35/16* (2006.01)
*B29L 31/30* (2006.01)

(52) U.S. Cl.
CPC ........ *B29C 66/0244* (2013.01); *B29C 66/112* (2013.01); *B29C 66/114* (2013.01); *B29C 66/47* (2013.01); *B29C 66/52272* (2013.01); *B29C 66/532* (2013.01); *B29C 66/71* (2013.01); *B29C 66/721* (2013.01); *B29C 66/7212* (2013.01); *B29C 66/91413* (2013.01); *F16B 4/006* (2013.01); *B29C 2035/165* (2013.01); *B29L 2031/3076* (2013.01)

(58) Field of Classification Search
CPC . B29C 66/71; B29C 66/532; B29C 66/52272; B29C 66/47; B29C 66/114; B29C 66/112; B29C 66/0244; B29C 65/66; B29C 65/14; B29C 2035/165; F16B 4/006; B29L 2031/3076

See application file for complete search history.

(56) References Cited

U.S. PATENT DOCUMENTS

| 4,867,822 | A | 9/1989 | Bannink, Jr. |
| 5,120,175 | A | 6/1992 | Arbegast et al. |
| 5,518,565 | A | 5/1996 | Castellucci et al. |
| 7,981,229 | B2 | 6/2011 | Hood et al. |
| 2005/0220533 | A1 | 10/2005 | Prichard |
| 2007/0234544 | A1 | 10/2007 | Bogue |
| 2008/0078864 | A1 | 4/2008 | Wilkerson et al. |
| 2009/0190868 | A1 | 6/2009 | Kane |
| 2009/0304315 | A1 | 12/2009 | Johnson |
| 2013/0075150 | A1 | 3/2013 | Newbolt et al. |
| 2013/0087380 | A1 | 4/2013 | Dilligan et al. |
| 2014/0174635 | A1 | 6/2014 | Shigetomi et al. |

FOREIGN PATENT DOCUMENTS

| EP | 2927508 A1 | 10/2015 |
| GB | 2486679 A | 6/2012 |
| GB | 2504206 A | 1/2014 |

OTHER PUBLICATIONS

United Kingdom Search Report dated Feb. 29, 2016, for United Kingdom Patent Application No. GB 1516039.3.

METHOD FOR DESIGNING AND FITTING, VIA INTERFERENCE, AN INSERT INTO AN OPENING IN A NON-METALLIC MATERIAL

CROSS-REFERENCE TO RELATED APPLICATION(S)

This is a National Stage Entry into the United States Patent and Trademark Office from International PCT Patent Application No. PCT/GB2016/052787, having an international filing date of Sep. 9, 2016, which claims priority to United Kingdom Patent Application No. GB 1516039.3, filed on Sep. 10, 2015, the entire contents of both of which are incorporated herein by reference.

FIELD OF THE INVENTION

The present invention concerns one or more methods for designing and fitting, via interference, an insert into an opening in a non-metallic material, such as a composite or polymeric material. More specifically, the present invention involves a method for designing and freeze fitting, via interference, an insert into an opening in a composite or polymeric material. The insert may be a plug or bushing, for example.

DESCRIPTION OF THE BACKGROUND AND RELATED ART

As should be apparent to those skilled in the construction of aircraft from non-metallic materials, there are circumstances where it becomes necessary to position an insert into an opening or hole in the material. The insert may be a solid plug or a bushing, among other possibilities.

In one contemplated example, it may be necessary to plug a hole drilled in the composite material incorrectly, such as of a wrong size or at an incorrect location.

In another contemplated example, it may be desirable to insert a bushing into an opening to accommodate a shaft therein. The bushing may provide a suitable location for a rotating shaft, for example.

As should be apparent to those skilled in the art, composite materials present a unique challenge when inserting a plug or bushing therein. Specifically, composite materials that are commonly used in the construction of aircraft typically are formed from multiple plies of woven carbon fiber fabric that are suspended in a resin matrix.

When inserting a plug or bushing into the composite material, care must be taken to avoid delamination of the composite material. Too much pressure on the composite material also may result in cracking and/or damage to the composite material.

In addition, it is important for the plug or bushing to be fitted into an opening with a sufficient interference to discourage removal or dislodgement of the plug and/or bushing from the opening. If the interference is insufficient, the bushing or plug might be inadvertently removed from the opening. If the interference it too tight, the pressure applied by the plug and/or bushing on the inner diameter of the opening might be so great to cause the composite material to crack or otherwise become damaged.

An additional challenge when inserting plugs or bushings into a composite material is that corrosion issues may arise. Specifically, the material from which the insert is made may not be compatible with the materials from which the composite material is made. In some instances of incompatibility, the insert may react chemically and/or electrochemically with the composite material, resulting in corrosion of one or both of the materials.

Also, when positioning an insert in a composite material, there are limitations on the handling of the composite material. Specifically, it is imprudent to heat the composite material before inserting the plug or bushing therein. Heating of the composite material may affect the physical properties of the composite material.

Separately, the coefficient of thermal expansion ("CTE") for the insert should be selected so that the CTE for the insert is compatible with the CTE for the composite material. If the CTEs for the two materials are incompatible, there is a possibility that one or both of the insert and/or the composite material may experience micro-cracking.

The prior art does not provide a suitable solution to one or more of the difficulties enumerated above.

Accordingly, an improved method for inserting a plug or bushing into an opening in a composite material is desirable.

SUMMARY OF THE INVENTION

The present invention addresses one or more of the deficiencies with respect to the prior art.

In particular, the present invention provides a method for inserting an insert into a hole in a composite material that includes lowering a temperature of the insert to a reduced temperature at which the material of the insert contracts to a first perimeter, inserting the insert at the reduced temperature into the hole in the composite material, and permitting the temperature of the insert to increase from the reduced temperature to an operational temperature. At the operational temperature, the insert presents a second perimeter greater than the first perimeter, so as to be retained within the composite material due to an interference between the insert and the composite material, the interference being such that structural load is transferred from the insert to the composite material and such that dislodging the insert at the operational temperature from the composite material results in damage to the composite material.

In one contemplated embodiment, the interference avoids micro-cracking of the composite material.

Further, the method of the present invention may include selecting a material for the insert that possesses a coefficient of thermal expansion that compliments the composite material to substantially avoid the generation of micro-cracks in the composite material when the insert is at the operational temperature.

It is contemplated, in one non-limiting embodiment, that the operational temperature lies between about −70° C. (about −94° F.) and about 160° C. (about 320° F.).

The present invention is contemplated to encompass one embodiment where the composite material comprises a plurality of carbon fiber layers suspended in a resin matrix.

Still further, the insert is contemplated to be at least one of a plug, a bushing, or a shaft.

In other embodiments, the insert may be at least one material selected from a group that includes a polymer, polyether ether ketone ("PEEK"), polyaryletherketone ("PAEK"), polyetherketoneketone ("PEKK"), polyphenylsulfone ("PPSU"), steel reinforced polymer ("SRP"), polyethylenimine ("PEI"), polyphenylene sulfide ("PPS"), polyphthalamide ("PPA"), and polytetrafluoroethylene ("PTFE") ceramics such as alumina trihydrate, montmorillonite, clay, talc, mica, silica, fly ash, wollastonite, kaolin, titanium, corrosion resistant stainless steel, steel, iron, iron alloys, alloys of copper, nickel and tin, copper, alloys of copper, nickel, alloys of nickel, tin, and alloys of tin.

In addition, the material also may include at least one of carbon powder, 30% carbon, carbon fibers, 40% carbon fibers, short carbon fibers, carbon black, carbon nanotubes, fiberglass, aramid fibers, graphene, silver, silver particles, nanoparticle silver, nickel, gold, copper, and semiconducting oxides.

Where semiconducting oxides are added, the semiconducting oxides may be at least one of zinc oxide, tin dioxide, and titanium dioxide.

In one non-limiting embodiment, the lowering of the temperature of the insert includes immersing the insert in liquid nitrogen.

In another non-limiting embodiment, the lowering of the temperature of the insert includes exposing the insert to dry ice.

It is contemplated that a tool may be employed when inserting the insert into the hole.

Still further, in selected embodiments of the present invention, a perimeter of the insert is contemplated to be at least one of knurled, grooved, sanded, roughened, or otherwise shaped to enhance engagement with a perimeter of the hole.

With respect to the method of the present invention, it is contemplated that the first perimeter of the insert is smaller than a perimeter of the hole at the reduced temperature.

Moreover, it is contemplated that the second perimeter of the insert is coextensive with the perimeter of the hole at the operational temperature.

Furthermore, the temperature of the insert may be raised at least one of radiantly, conductively, convectively, or inductively.

According to one embodiment of the present invention, after insertion, a first side of the insert is flush with a first side of the composite material and a second side of the insert is flush with a second side of the composite material.

In another embodiment of the present invention, the insert is a plug that includes a central portion and a plurality of wrapped layers surrounding the central portion. If so, the central portion and the wrapped layers may be constructed from different materials.

In an alternative embodiment, the present invention provides an aircraft component, comprising a composite material comprising a hole extending through a thickness of the composite material and an insert positioned within the hole. The insert comprises a PEEK material enhanced by carbon fibers. The insert is held within the hole via an interference between the insert and the composite material.

Further aspects of the present invention will be made apparent from the paragraphs that follow.

BRIEF DESCRIPTION OF THE DRAWING(S)

The present invention will now be described in connection with the drawings appended hereto, in which.

DETAILED DESCRIPTION OF EMBODIMENT(S) OF THE INVENTION

The present invention will now be described in connection with one or more embodiments thereof. The discussion of the embodiments is not intended to be limiting of the present invention. To the contrary, any discussion of embodiments is intended to exemplify the breadth and scope of the present invention. As should be apparent to those skilled in the art, variations and equivalents of the embodiment(s) described herein may be employed without departing from the scope of the present invention. Those variations and equivalents are intended to be encompassed by the scope of the present patent application.

Figure 1:
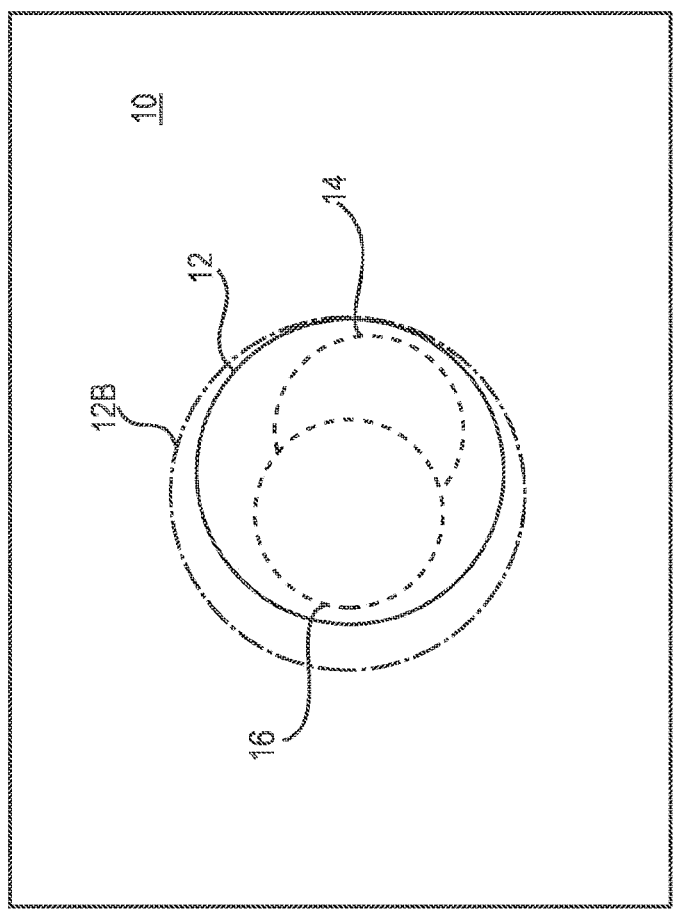
FIG. 1 is a graphical, top view of a portion of a composite material providing one environment for the present invention.

FIG. 1 is a graphical top view of one contemplated environment for application of the present invention. In particular, FIG. 1 illustrates a portion of a composite material 10. The composite material 10 is contemplated to be made from layers of woven carbon fiber fabric suspended in a resin matrix. The carbon fibers may be laminates with thermoset matrices, thermoplastic matrices, and/or ceramic matrices, among others.

As should be apparent to those skilled in the art, the present invention is not contemplated to be limited to composite materials 10 solely with a carbon fiber construction. Composite materials 10 made from other materials, including but not limited to fiberglass, aramid fibers, and nylon, also are contemplated to fall within the scope of the present invention. In addition, while woven fiber layers are contemplated to make up the composite material 10, the present invention also is contemplated to encompass non-woven composites. Furthermore, composite materials 10 that incorporate a honeycomb or foam sandwich construction also are contemplated to fall within the scope of the present invention.

For the sake of simplicity, the present invention will be described in the context of a composite material. However, it should be appreciated that the invention is equally as applicable to a polymeric material.

As illustrated in FIG. 1, the composite material 10 has a hole 12 (or opening 12) therein. The hole 12 is contemplated to penetrate completely through the composite material 10. The hole 12 may have been created as a result of drilling or may have been formed during the manufacture of the composite material 10. For clarity, the present invention is not contemplated to be limited to the manner in which the hole 12 is created in the composite material 10.

FIG. 1 also includes an indication of two small holes 14, 16, which are illustrated in dotted line format. The small holes 14, 16 are provided to indicate prior, drilled holes in the composite material 10. It is contemplated that the small holes 14, 16 may have been drilled for receipt of a fastener, for example. As illustrated, the two small holes 14, 16 overlap one another, suggesting that the small holes 14, 16 were drilled in incorrect locations. Alternatively, one of the holes 16 may be in the correct location, as suggested by FIG. 1. In such a case, in order to repair the composite material 10 it may be necessary to increase the diameter 12b of the hole 12 in an offset manner, as illustrated.

Figure 2:
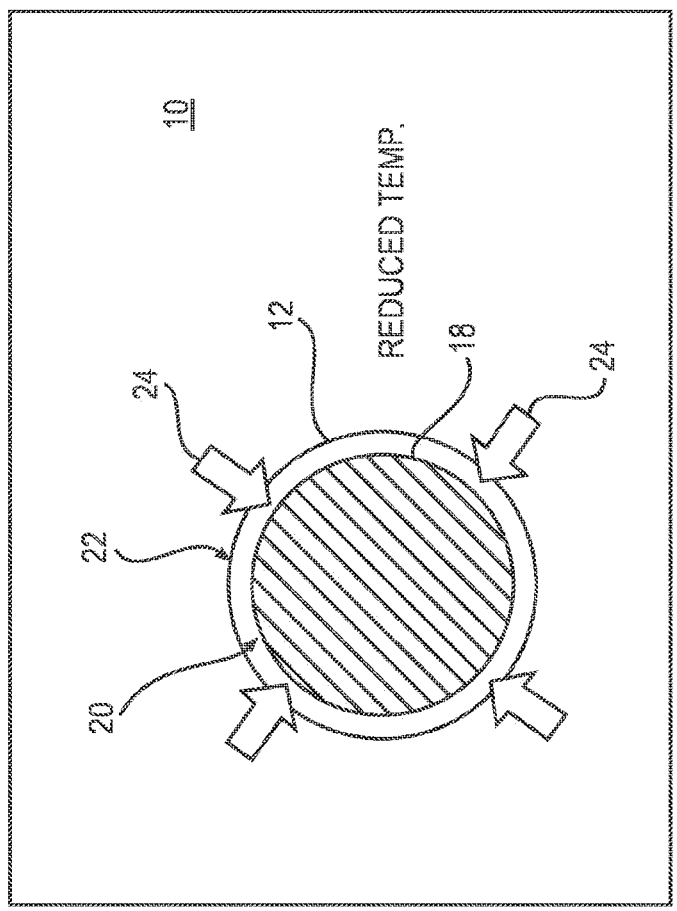
FIG. 2 is a graphical, top view of the composite material illustrated in FIG. 1, with a first embodiment of a plug, at a reduced temperature, inserted in a hole in the composite material.

To correct these drilling defects and/or make corrections, it is contemplated that a plug 18, as illustrated in FIG. 2, may be inserted into the larger hole 12. After being inserted, the plug 18 is contemplated to repair the composite material 10 by filling the hole 12. As should be apparent, the drilling of the larger hole 12 and the placement of a plug 18 in the larger hole 12 eliminates the small holes 14, 16 altogether, thereby correcting any error in the placement of the small holes 14, 16. Once inserted, a new hole may be re-drilled through the plug 18 in order to correct the size or position of a desired hole.

In cases where accurate measurement systems are available (such as laser scans, among other possibilities) is may be possible to provide a plug 18 that has a peripheral shape suitable for filling the combination of holes 14, 16. Such a plug 18 could be generated via CNC machining or 3D printing, among other possibilities, and would have a "snowman" type of shape.

It is noted that there are other defects, aside from miss-drilled (or misplaced) holes 14, 16, that may require correction as provided by the present invention. For example, a hole 14, 16 may require correction due to overheating of a bore. There may be fiber pull-out associated with the hole 14, 16. There may be splintering of the composite material 10. The composite material 10 may have experienced localized delamination. There may have developed a "volcano" effect on the entrance and/or exit of the hole 14, 16. Still further, the holes 14, 16 may have been drilled to the wrong size. As may be apparent to those skilled in the art, there are still other reasons why the present invention might be employed.

In addition to the correction of defects, which may require the insertion of a plug 18 into the hole 12, it is contemplated that it may be desirable to insert a bushing 28 into the hole 12. The insertion of a bushing into the hole 12 is illustrated in FIGS. 4-5 and 7-11, in one non-limiting example.

Regardless of the placement of a plug 18 or a bushing 28 into the hole 12, one difficulty that persists for establishing an interference between the plug 18 or bushing 28 and the composite material 10 lies in the potential for damage to the composite material 10. As should be apparent to those skilled in the art, an interference between the plug 18 or bushing 28 and the composite material 10 requires a delicate balance of variables. In particular, the plug 18 or bushing 28 needs to be sized, manufactured, and/or designed to tight tolerances in order to avoid micro-cracking, splitting, and delaminating the composite material 10 (among other potential undesirable effects). The present invention employs, among other things, a freeze fit methodology to permit the proper insertion of plugs 18 and bushings 28 into the composite material 10.

For purposes of the present invention, the term "insert" is employed to refer to the element inserted into the hole 12, or holes 14, 16. The specific examples discussed herein encompass a plug 18 and/or a bushing 28 (or "bush 28"). The present invention, however, should not be understood to be limited to embodiments where the insert is either a plug 18 or a bushing 28. To the contrary, the present invention is intended to encompass any insert, regardless of the construction of the insert.

The insertion of the plug 18 into the hole 12 is now discussed in connection with FIGS. 2 and 3.

FIG. 2 provides a graphical, top view of the composite material 10, showing the hole 12. In this illustration, as indicated, the plug 18 is at an "as designed" reduced temperature at which the material of the plug 18 contracts/shrinks (hereafter "the reduced temperature"). As a result, at the reduced temperature, the perimeter 20 of the plug 18 is smaller than the perimeter 20 of the plug 18 at an operational temperature of the aircraft (hereafter "the operational temperature"). At the reduced temperature, the perimeter 20 of the plug is smaller than the perimeter 22 of the hole 12.

For purposes of discussing the present invention, the perimeter 20 of the insert at the reduced temperature is referred to as "the first perimeter." The perimeter 20 of the insert at the operational temperature is referred to as "the second perimeter." The second perimeter is larger than the first perimeter due to the CTE for the material(s) from which the insert is constructed. As indicated, the perimeter 20 of the insert is larger than the perimeter 22 of the hole 12 at the operational temperature.

In the discussion that follows, reference to "the operational temperature" is not intended to refer to a specific temperature. Instead, the operational temperature is contemplated to lie within a range of temperatures. The operational temperature is defined broadly, for purposes of the present invention, as a temperature to which the insert is subjected during normal operation of the aircraft. At the operational temperature, the insert transitions to a state where the insert exhibits a size consistent with the second perimeter.

In the discussion that follows, reference to "the reduced temperature" is not intended to refer to a specific temperature. Instead, the reduced temperature is contemplated to be a temperature at which the insert transitions to exhibit a size consistent with the first perimeter, which is a perimeter smaller than that of the hole 12 and smaller than that of the insert when at the operational temperature.

The term "perimeter," as used in connection with the present invention is intended to encompass any shape for the insert. If the insert is circular, the perimeter is consistent with the circumference of the insert. However, the insert need not be circular. The insert may be, for example, square, rectangular, oval, elliptical, triangular, polygonal, and/or amorphously-shaped without departing from the scope of the present invention. It is at least for this reason that the term "perimeter" is employed. As should be apparent, the term "perimeter" is intended to be broad in scope and application to the present invention.

Figure 3:
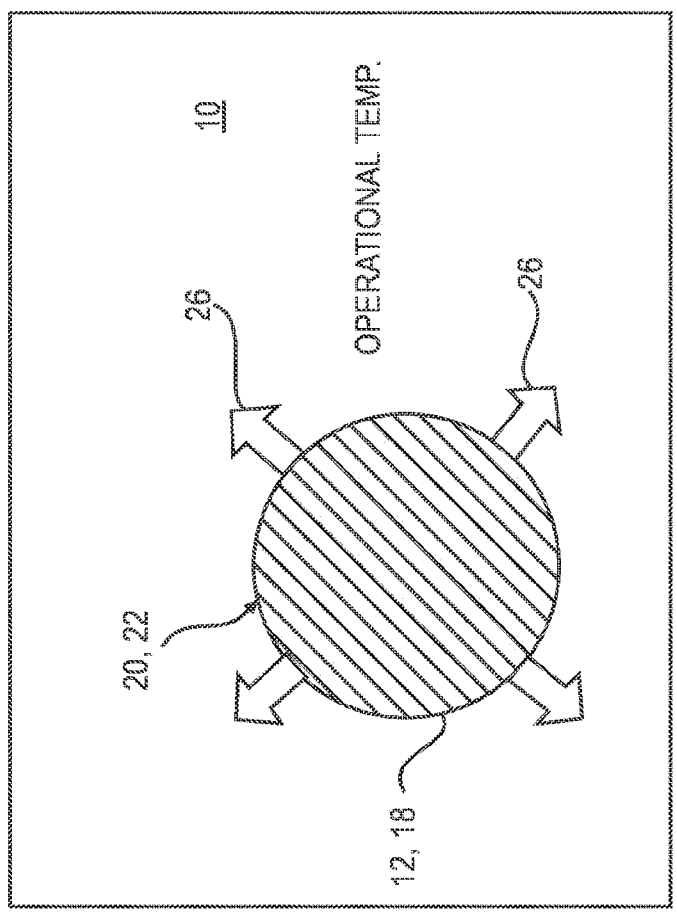
FIG. 3 is a graphical, top view of the composite material illustrated in FIG. 2, where the plug has expanded to fill the hole upon reaching an operational temperature.

In FIGS. 2 and 3, the plug 18 is circular and the hole 12 also is circular. As such, the plug is designed such that, at the reduced temperature, the plug 18 has an outer diameter that is smaller than the inner diameter of the hole 12.

As may be apparent, it is contemplated that the shape of the plug 18 will be complimentary to the shape of the hole 12 so that, when the plug 18 expands at the operational temperature, the perimeter 20 of the plug 18 will form an interference with the perimeter 22 of the hole 12. For example, the insert may have a shape suitable for being positioned within a hole having a countersink. However, a complimentary shape is not required to practice the present invention. In the alternative, it is possible that there may be one or more gaps between the plug 18 and the perimeter 22 of the hole 12.

With further reference to FIG. 2, the plug 18 is illustrated at the reduced temperature. As a result, the plug 18 has contracted such that its perimeter is sized small enough to fit within the hole 12. The arrows 24 are provided to indicate that the plug 18 is in a shrunken state due to it being at the reduced temperature.

FIG. 3 illustrates the plug 18 after the plug 18 reaches the operational temperature. Here, the perimeter 20 of the plug 18 and the perimeter 22 of the hole 12 are coextensive, because the plug 18 has expanded to fill the hole 12. The arrows 26 are provided to indicate the expansion of the plug 18. More specifically, the arrows 26 indicate that the plug 18 has expanded to a point where the plug 18 exerts a force on the walls of the hole 12 to establish an appropriate interference between the plug 18 and the hole 12.

An interference is contemplated to include a fit between the plug 18 and the hole 12 that is sufficiently strong to retain the plug 18 within the composite material 10 and transfer structural loads from the plug 18 to the composite material 10. More specifically, the interference is sufficient to prevent dislodgement of the plug 18 from the hole 12 under normal operational conditions. An interference also is contemplated to be of such a magnitude to avoid micro-cracking of the composite material 10. Within these parameters, it is contemplated that the interference will be strong enough to prevent the plug 18 from becoming dislodged from the hole 12 due to vibrations transmitted through the composite material 10 while also maintaining the integrity of the composite material 10.

As should be apparent, the interference is contemplated to remain viable over the operational temperature range anticipated for the composite material 10. The operational temperature range is higher than the reduced temperature.

In one non-limiting embodiment of the present invention, the interference is contemplated to be acceptable if the interference between the plug 18 and the composite material 10 is sufficiently strong that an attempt to dislodge the plug 18 from the hole 12 results in damage, such as delamination and/or micro-cracking, of the composite material 10.

Figure 4:
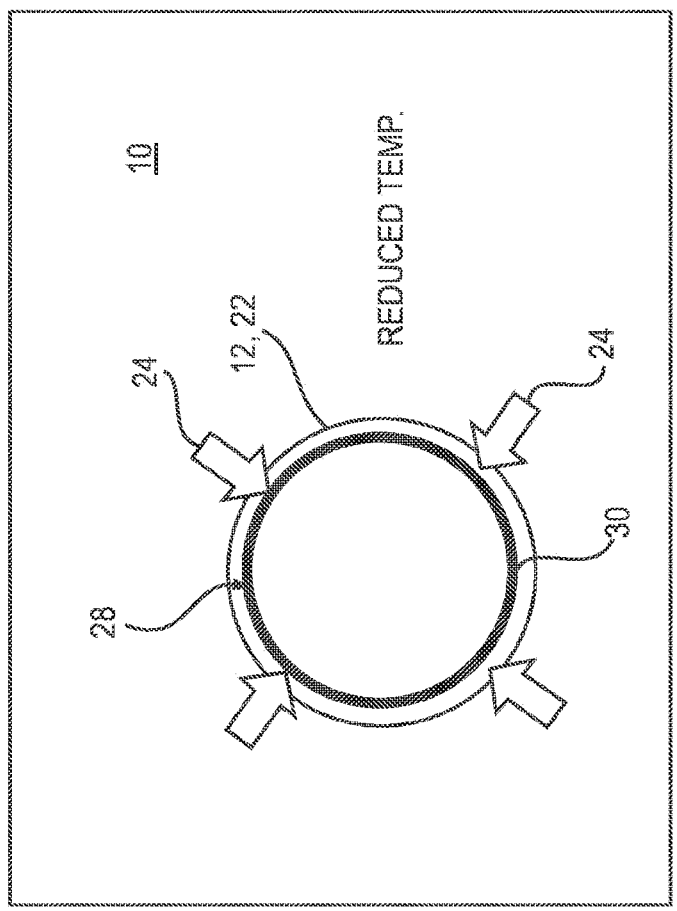
FIG. 4 is a graphical, top view of the composite material illustrated in FIG. 1, showing a bushing, at a reduced temperature, inserted in a hole in the composite material.

FIG. 4 is a graphical, top view of the composite material 10 illustrated in FIG. 1. Here, the plug 18 is replaced with a bushing 28. A bushing 28, also referred to as a bush 28, is a cylindrical structure typically employed to support a rotating shaft. While a bushing 28 typically receives a rotating shaft, the present invention should not be understood to refer only to bushings 28 that are adapted to receive a rotating shaft. To the contrary, other configurations also are contemplated to fall within the scope of the present invention.

Since the bushing 28 illustrated in FIG. 4 is at the reduced temperature, the perimeter 30 of the bushing 28 is smaller than the perimeter 22 of the hole 12.

As in the embodiment involving the plug 18, the bushing 28 is circular. As before, the hole 12 is circular. As a result, when the temperature of the bushing 28 is lowered to the reduced temperature, the bushing 28 has an outer diameter that is smaller than the inner diameter of the hole 12.

As in the case of the plug 18, it is contemplated that the shape of the bushing 28 will be complimentary to the shape of the hole 12 so that, when the bushing 28 expands to fill the hole 12 at the ambient temperature, the perimeter 30 of the bushing 28 will form an interference with the perimeter 22 of the hole 12. However, a complimentary shape is not required to practice the present invention. As with the plug 18, it is possible that there may be one or more gaps between the bushing 28 and the perimeter 22 of the hole 12.

For purposes of the present invention, the perimeter 30 of the bushing 28 may have any shape. The perimeter 22 of the hole 12 also may have any shape. As before, without limiting the present invention, the perimeter 30 of the bushing 28 and the perimeter 22 of the hole 12 may be circular, elliptical, oval, square, rectangular, triangular, polygonal, or amorphously-shaped.

With further reference to FIG. 4, the bushing 28 is illustrated at the reduced temperature, at which the material of the plug 18 has contracted or shrunk a desirable amount. As a result, the bushing 28 has contracted such that its perimeter 30 is small enough to fit within the hole 12. The arrows 24 are provided to indicate that the bushing 28 is in a shrunken state due to being at the reduced temperature.

Figure 5:
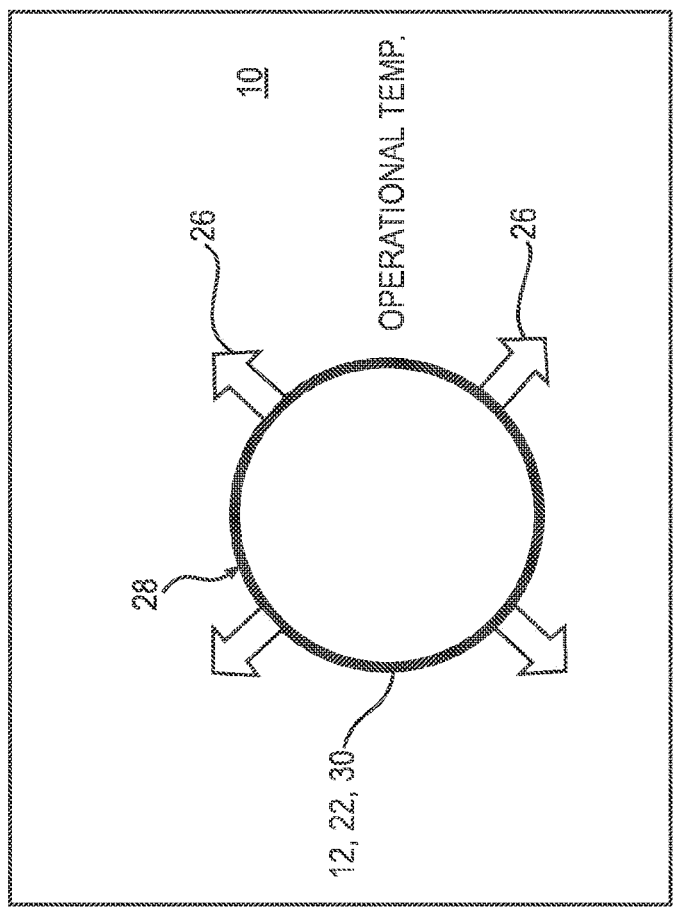
FIG. 5 is a graphical, top view of a the composite material illustrated in FIG. 4, where the bushing has expanded to fill the hole upon reaching an operational temperature.

FIG. 5 illustrates the bushing 28 after the bushing 28 reaches the operational temperature. Here, the perimeter 30 of the bushing 28 and the perimeter 22 of the hole 12 are coextensive, because the bushing 28 has expanded to fill the hole 12. The arrows 26 are provided to indicate that the bushing 28 is at the operational temperature. More specifically, the arrows 26 indicate that the bushing 28 exerts a force on the walls of the hole 12 to establish an interference between the bushing 28 and the walls of the hole 12.

As in the case of the plug 18, an interference is contemplated to include a fit between the bushing 28 and the hole 12 that is sufficiently strong to retain the bushing 28 within the composite material 10 and transfer structural loads from the bushing 28 to the composite material 10. More specifically, the interference is sufficient to prevent dislodgement of the bushing 28 from the hole 12 under normal operational conditions. The interference also is contemplated to avoid micro-cracking of the composite material 10. As discussed, it is contemplated that an interference will be strong enough to prevent the bushing 28 from becoming dislodged from the hole 12 due to vibrations transmitted through the composite material 10 while also maintaining the integrity of the composite material 10. As discussed above, the interference also is contemplated to remain viable over the operational temperature range anticipated for the composite material 10.

As with the plug 18, in one non-limiting embodiment of the present invention, the interference is contemplated to be acceptable if the fit between the bushing 28 and the composite material 10 is sufficiently strong that an attempt to push the bushing 28 out of the hole 12 results in damage, such as micro-cracking and/or delamination, of the composite material 10.

Figure 6:
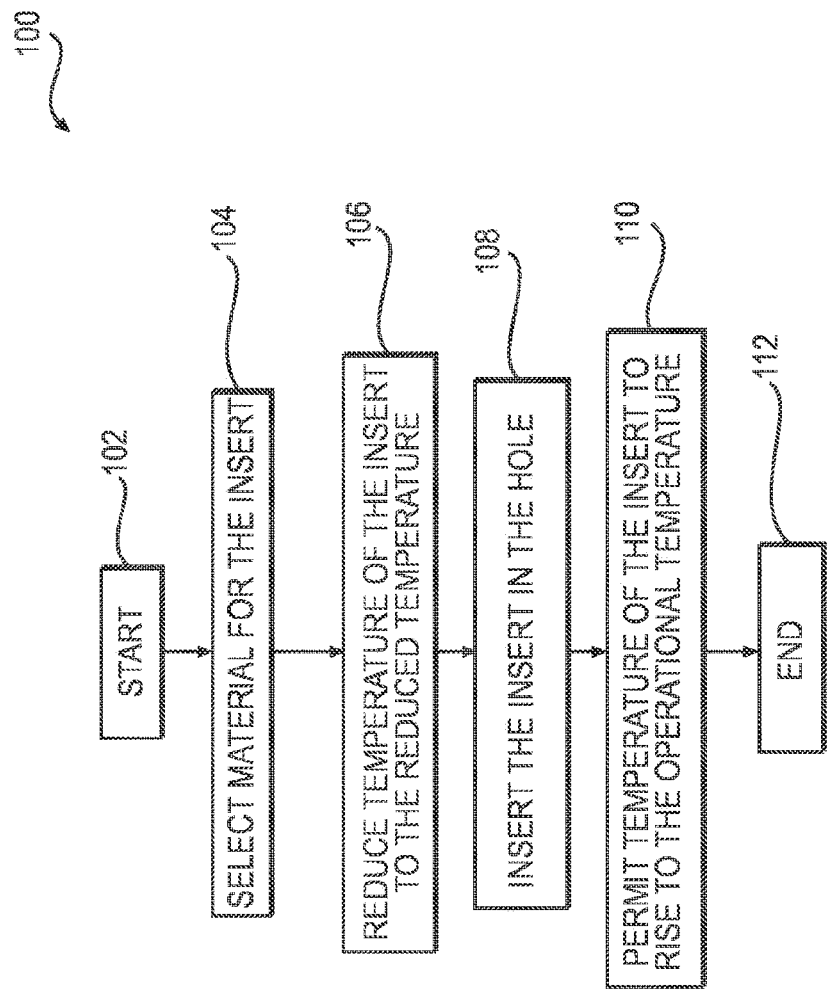
FIG. 6 is a flow chart outlining one method contemplated by the present invention.

FIG. 6 provides a flow chart that summarizes one method contemplated for the present invention. The method 100 starts at block 102.

The method 100 proceeds to block 104 where an appropriate material is selected for the insert, whether a plug 18 or a bushing 28 (or any other type of insert).

At step 104, there are a number of considerations that are contemplated to be taken into account when selecting the material for the insert. For example, selected properties of the composite material 10 may be taken into account. The properties include, but are not limited to the CTE for the composite material 10, the chemical compositions of the various elements of the composite material 10, and any incompatibility between the composite material 10 and the insert. The properties of the composite material 10 also are contemplated to be evaluated across the range of the operational temperatures, which are above the reduced temperature.

With respect to the selection of the material for the insert, whether a plug 18 or a bushing 28, properties of interest include, but are not limited to the CTE for the insert, its chemical properties, the degree to which the insert may interact (chemically, electrically, or otherwise) with the composite material 10, etc.

With respect to the CTE for the insert, the CTE is contemplated to lie within a range of values that permit sufficient shrinkage of the insert at the reduced temperature so that it is able to easily be inserted into the hole 12 and establishment of the interference between the insert 10 and the perimeter of the hole 12, across the range of temperatures associated with the operational temperature (meaning the temperatures experienced by the aircraft during operation).

In order to achieve the desired interference as defined above, the sizing of the insert may play an important role. The size of the hole to be filed may be measured accurately, and in a non-limiting embodiment, the insert 10 may be manufactured to a tolerance of within approximately 0.0005 inches of its desired dimension, and more preferably to within 0.0001 inches of its desired dimension. This differs from the tolerances generally seen in existing inserts, which are typically manufactured to within a tolerance of 0.005-0.01 inches of their intended dimensions. It is to be understood that the manufacturing tolerance may be larger or smaller depending on the desired size of the insert and the material used for the insert 10, as well as the material of the component into which the insert is being installed. The insert 10 may be manufactured to within precise tolerances using a CNC lathe, for example.

In one contemplated embodiment of the present invention, the insert may be made in one or more standard sizes. As such, it is contemplated that the plug 18 or bushing 28 may be inserted into a hole 12 that is prepared to accommodate the standard size of the insert 10. For example, the hole 12 may be prepared via an accurate reamer. In another embodiment, the hole 12 may be prepared by a series of reamers that incrementally increase the diameter of the hole 12 until the desired size is achieved. As should be apparent, reliance on standard sizes for the insert 10 reduces the number of inserts that would be required to be kept in inventory at any given time.

The method 100 proceeds from block 104 to block 106. At block 106, the insert is caused to acquire the reduced temperature. At the reduced temperature, the dimensions of the insert (i.e., the perimeter) will be smaller than the hole 12 so that the insert may be positioned in the hole 12. As noted above, at the reduced temperature, the insert exhibits a size consistent with the first perimeter.

There are a number of ways in which the temperature of the insert may be lowered to the reduced temperature. A controllable refrigeration device may be employed so that the insert is chilled exactly to the reduced temperature. Alternatively, the insert may be chilled using liquid nitrogen, frozen carbon dioxide, or other suitable materials known to those skilled in the art. The precise methodology for chilling the insert to the reduced temperature is not critical to the present invention. With this in mind, liquid nitrogen is contemplated to be a suitable cooling agent for purposes of reducing the dimensions of the insert to the first perimeter.

The method proceeds to block 108 from block 106. At block 108, the insert is inserted within the hole 12. This may be done using a special tool as will be described below with reference to FIG. 7.

The method 100 proceeds to block 110 from block 108. At block 110, the temperature of the insert is permitted to rise, passively and/or actively, to the operational temperature. The temperature may be permitted to rise passively by allowing the temperature of the insert to rise naturally. Alternatively, the temperature of the insert may be raised actively by applying energy to the insert. Energy is contemplated to be applied as a result of operation of the aircraft, but the present invention is not considered to be limited thereto. It is contemplated that the insert may be heated slightly to facilitate rapid expansion.

As noted, when the insert reaches the operational temperature, the insert is contemplated to have expanded to the second perimeter so that an interference is established between the insert and the composite material 10.

By positioning the insert into the composite material using the thermal properties of the insert, the method of the present invention avoids applying normal forces to the composite material in order to achieve an interference between the two parts. Instead, the interference is established as a result of the insert acquiring its "as designed" dimension at an operational temperature. As such, when installed, only a radial force is exerted on the insert, as well as into the composite material. This helps to avoid delamination and micro-cracking of the composite material.

In addition, the insert does not need to be stretched or mechanically expanded in order to acquire the second perimeter. The selection of insert material, as well as its tightly controlled dimensional tolerance, allows the insert to achieve the desired interference with the composite material at its "as designed" dimension. This combination of factors provides an improved, better construction for an aircraft component.

The method 100 ends at block 112.

FIGS. 7-11 are graphical side views illustrating various operations, in sequence, for one contemplated embodiment of a procedure for inserting a bushing 28 into the hole 12. The sequence of operations is meant to be illustrative of the breadth of the present invention and not limiting thereof.

Figure 7:
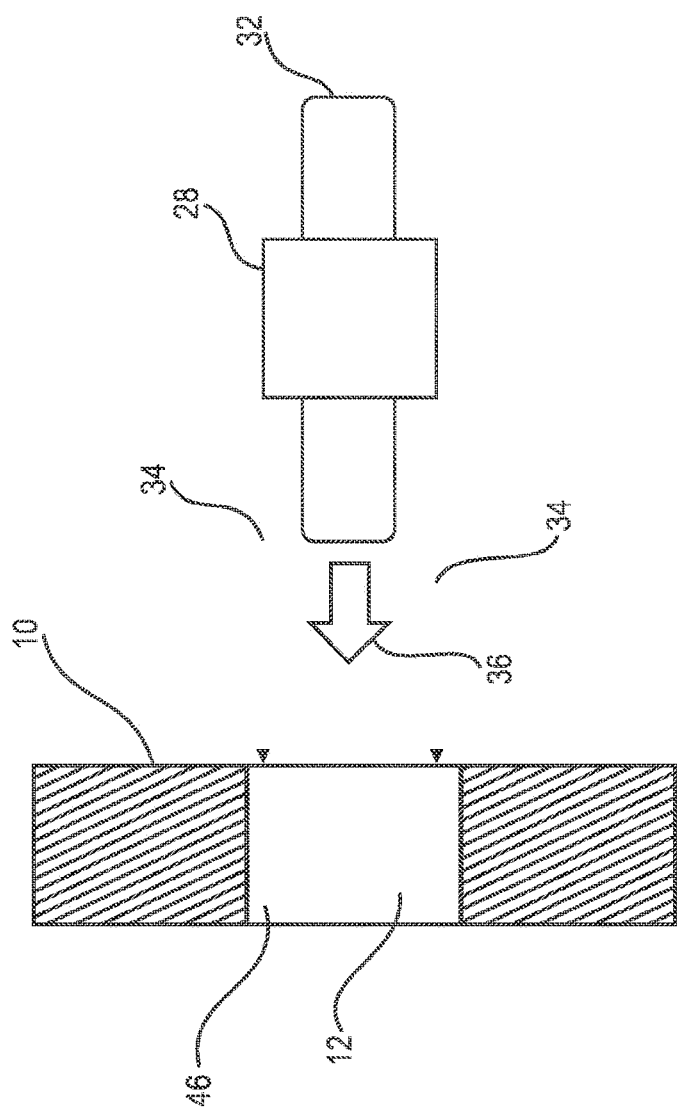
FIG. 7 is a graphical, side view of the composite material illustrated in FIG. 4, showing a first operation for inserting a bushing into a hole in the composite material.

FIG. 7 is a graphical, side view illustrating a first operation for inserting the bushing 28 into the hole 12.

In FIG. 7, the bushing 28 is shown disposed on a graphical representation of a tool 32, such as a mandrel. It is contemplated that the bushing 28 will slide onto the tool 32, permitting a user to position the bushing 28 into the hole 12 in the composite material 10 by inserting both the tool 32 and the bushing 28 into the hole. The arrows 34, 36 indicate the direction of insertion of the tool 32 and the bushing 28 into the hole 12.

Figure 8:
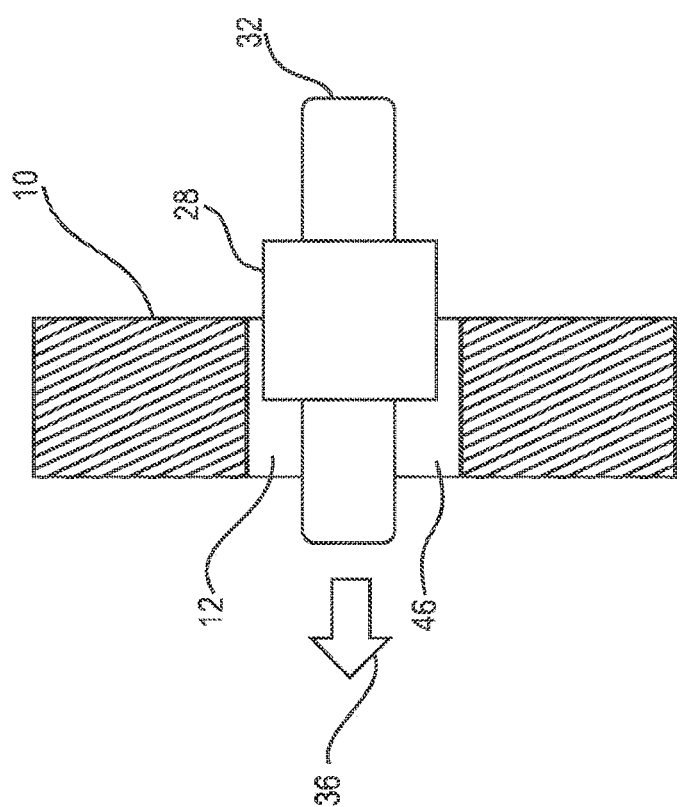
FIG. 8 is a graphical side view of the composite material illustrated in FIG. 7, showing a second operation for inserting a bushing into a hole in the composite material.

FIG. 8 is a graphical, side view of a second operation for inserting the bushing 28 into the hole 12. In this view, the tool 32 and the bushing 28 are partially inserted through the composite material 10.

Figure 9:
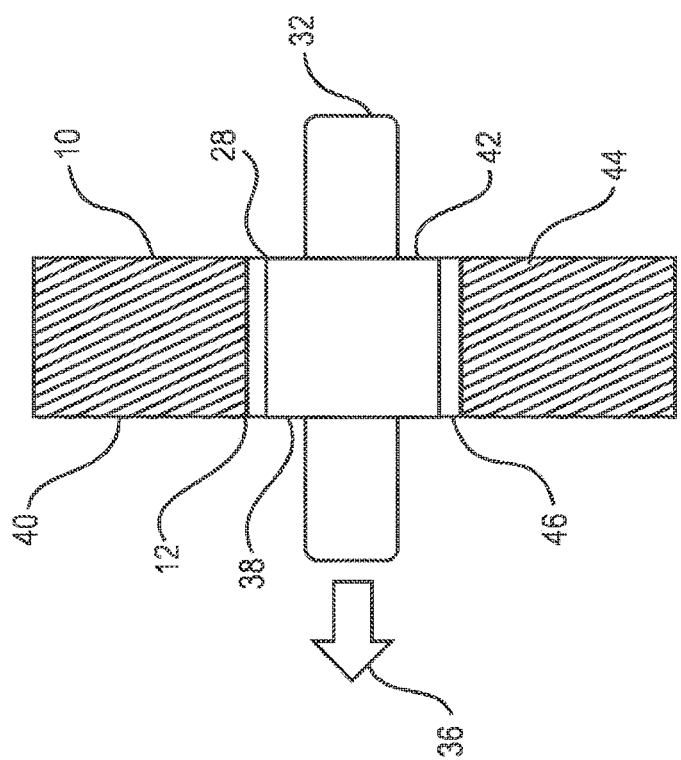
FIG. 9 is a graphical side view of the composite material illustrated in FIG. 8, showing a third operation for inserting a bushing into a hole in the composite material.

FIG. 9 is a graphical, side view of a third operation for inserting the bushing 28 into the hole 12. In this illustration, the bushing 28 has been fully inserted so that a first side 38 of the bushing 28 is flush with a first side 40 of the composite material 10. Similarly, a second side 42 of the bushing 28 is flush with a second side 44 of the composite material 10. It is noted that the first and second sides 38, 42 of the bushing 28 need not be flush with the first and second sides 40, 44 of the composite to practice the present invention. They may be offset from one another without departing from the scope of the present invention.

Figure 10:
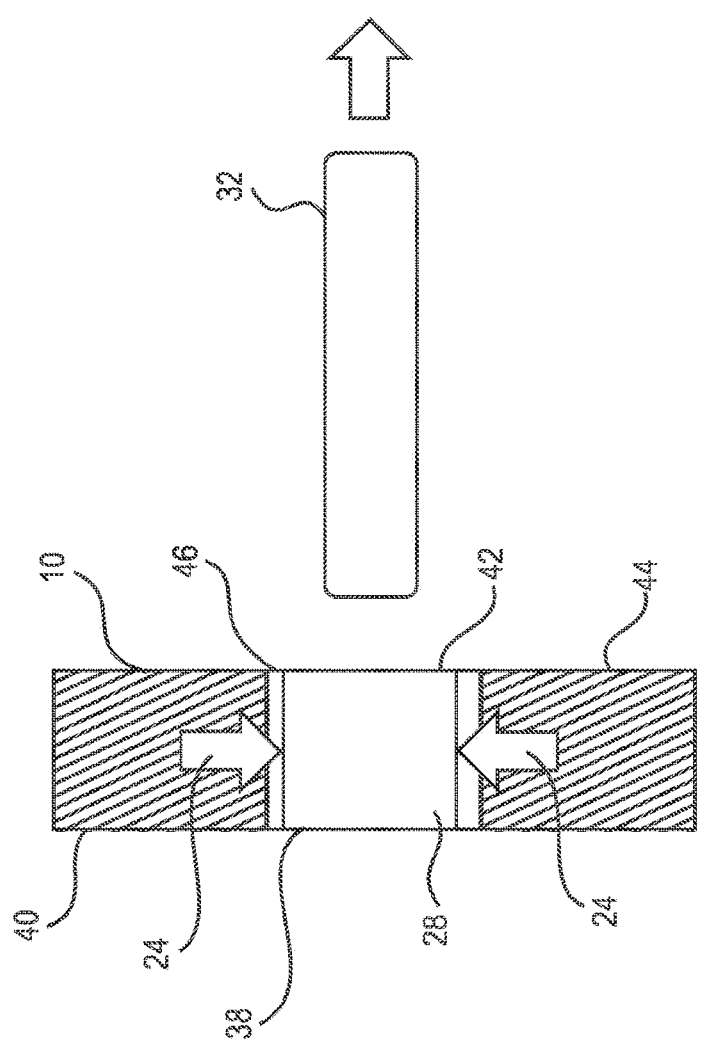
FIG. 10 is a graphical, side view of the composite material illustrated in FIG. 9, showing a fourth operation for inserting a bushing into a hole in the composite material.

FIG. 10 is a graphical, side view of a fourth operation for inserting the bushing 28 into the hole 12. Here, it is contemplated that the tool 32 is removed from the bushing 28. The bushing 28, however, remains in the hole 12. It is contemplated that there will be at least a minimal amount of frictional engagement between the bushing 28 and the walls 46 of the hole 12 to retain the bushing 28 therein. Separately, the bushing 28 may be retained in the hole 12 by other devices, as should be apparent to those skilled in the art.

In FIG. 10, the arrows 24 illustrate that the bushing 28 is in the reduced temperature state. In other words, the bushing 28 is contemplated to be at the reduced temperature where the bushing 28 is shrunken by comparison with the size of the bushing 28 at the operational temperature. In this state, the bushing 28 exhibits dimensions consistent with the first perimeter.

Figure 11:
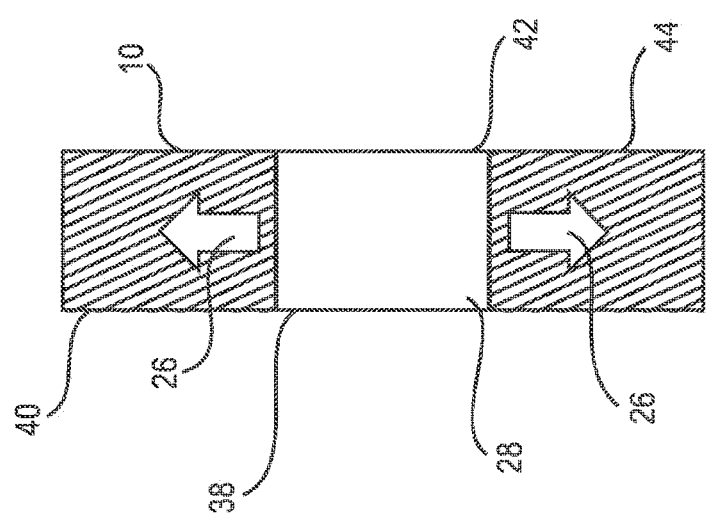
FIG. 11 is a graphical side view of the bushing after being positioned in the hole in the composite material and reaching an operational temperature.

FIG. 11 is a graphical, side view of the bushing 28 in the hole 12 after the bushing 28 has reached operational temperature and has resumed its operational size. In this state, the bushing 28 establishes an interference with the composite material 10, as discussed above. In this illustration, the bushing 28 has dimensions consistent with the second perimeter.

While not illustrated, a similar tool may be employed to insert the plug 18 into the hole 12.

The present invention contemplates that the plug 18 and the bushing 28 described above may be made from a wide variety of materials. As may be appreciated by those skilled in the art, the materials that may be employed are limited primarily by the coefficient of thermal expansion associated with the material. The coefficient of thermal expansion ("CTE") is intended to refer to either the linear coefficient of thermal expansion, the area coefficient of thermal expansion, and/or the volumetric coefficient of thermal expansion.

Materials that are contemplated for the plug 18 and the bushing 28 include, but are not limited to, polymers. As a general rule, polymers are resistant to cryogenic freezing (i.e., they are resistant to micro-cracking) and have a high enough glass transition temperature ("$T_g$") to accommodate the contemplated operational temperature (that is the operating temperature range) for the aircraft. In addition, polymers exhibit excellent creep resistance and are able to resist the deleterious effects from a number of aerospace fluids including, but not limited to, water, hydraulic fluid, fuel, etc.

Polymers that are contemplated for the present invention include, but are not limited to polyether ether ketone ("PEEK"), polyaryletherketone ("PAEK"), polyetherketoneketone ("PEKK"), polyphenylsulfone ("PPSU"), steel reinforced polymer ("SRP"), polyethylenimine ("PEI"), polyphenylene sulfide ("PPS"), polyphthalamide ("PPA"), and polytetrafluoroethylene ("PTFE"). These polymers may be used singly or together. For example, small amounts of PTFE may be added to enhance the tribolical properties of the insert.

Separately, it is contemplated that the polymers may be enhanced by the addition of carbon powder, 30% carbon fibers, 40% carbon fibers, short carbon fibers, carbon black, carbon nanotubes, fiberglass, aramid fibers, graphene, silver (Ag), silver particles, nanoparticle silver, nickel (Ni), gold (Au), copper (Cu), and semiconducting oxides. Semiconducting oxides include, but are not limited to zinc oxide (ZnO), tin dioxide ($SnO_2$), and titanium dioxide ($TiO_2$). In addition, it is contemplated that the plug 18 and the bushing 28 may be made from ceramics such as alumina trihydrate ($Al_2O_3 \cdot 3H_2O$), montmorillonite, clay, talc, mica, silica, fly ash, wollastonite ($CaSiO_3$), kaolin (also referred to as kaolinite ($Al_2Si_2O_5(OH)_4$)), etc.

Still further, the plug 18 and/or the bushing 28 (i.e., the insert) may be made from metals including, but not limited to titanium (Ti), corrosion resistant stainless steel ("CRES"), steel, iron (Fe), iron alloys, alloys of copper, nickel and tin (CuNiSn alloys, also referred to as "Toughmet alloys"), copper, alloys of copper, nickel, alloys of nickel, tin, and alloys of tin.

For purposes of the present invention, it is contemplated that CuNiSn alloys and PEEK polymers (including, but not limited to PEEK filled materials) are likely to be the most suitable materials for construction of the insert. However, any one of the materials or combination of materials listed above may be employed without departing from the scope of the present invention.

In contemplated embodiments of the present invention, at least a portion of the surface of the plug 18 or bushing 28 may be knurled, grooved, sanded, roughened, or otherwise shaped to enhance engagement with the perimeter 22 of the hole 12. In addition, adhesive and/or sealant may be used with the plug 18 or bushing 28 in order to enhance its interference with the composite material. Encapsulating materials (i.e., coatings and finishes) also may be added without departing from the scope of the present invention.

For the present invention, the insert is contemplated to be cooled to the reduced temperature prior to insertion into the hole 12 in the composite material 10. For the purposes of the present invention, the reduced temperature is contemplated to be low enough to effectuate a sufficiently large change in the perimeter of the insert so that the insert may be inserted easily into the hole 12.

The reduced temperature, at which the insert exhibits dimensions consistent with the first perimeter, may vary for each material that may be used for the plug 18 or the bushing 28. Since the reduced temperature is material-specific, the present invention is contemplated to rely on one or more reduced temperatures that are easily established.

Liquid nitrogen is readily available commercially and may be relied upon to establish the reduced temperature. Specifically, it is contemplated that the plug 18 or bushing 28 may be immersed in liquid nitrogen, which has a temperature of −195.79° C. (−320° F.). It is also contemplated that solid carbon dioxide (otherwise known as dry ice) may be employed as a low temperature agent. Carbon dioxide freezes at −78.5° C. (−109.3° F.). As such, the reduced temperature may span over a range of temperatures, such as between about −78.5° C. (−109.3° F.) and −195.79° C. (−320° F.). Obviously, the reduced temperature may include temperatures even colder than those listed above.

In one non-limiting embodiment of the present invention, it is also contemplated that the portion of the tool 32 that contacts the bushing 28 also may be at the reduced temperature. As such, the tool 32 should not cause an increase in the temperature of the bushing 28 before placement in the hole 12 in the composite material 10.

According to one non-limiting aspect of the present invention, it is contemplated that the material selected for the plug 18 and/or bushing 28 will maintain an acceptable interference over the range of temperatures anticipated to operation of an aircraft. At an altitude of 38,000 feet, the temperature of the atmosphere is about −70° C. (about −94° F.). Maximum ground temperatures are anticipated not to exceed about 46.11° C. (about 115° F.). Accordingly, the material selected for the construction of the plug 18 or the bushing 28 should be capable of providing an acceptable interference over an operational temperature range of between about −70° C. (about −94° F.) and about 46.11° C. (about 115° F.). Separately, the plug 18 or the bushing 28 may be designed to operate over a wider range of operational temperatures, such as between about −70° C. (−94° F.) and 160° C. (320° F.).

With regard to the upper temperature range for the acceptable interference, it is contemplated that the material selected for construction of the plug 18 and/or bushing 28 will not cause damage to the composite material 10 at the upper end of the operational temperature. Damage includes, but is not limited to, micro-cracking and delamination of the composite material 10 adjacent to the hole 12. As a result, certain materials that have a very high coefficient of thermal expansion may prove to be unsuitable for use with the composite material 10.

As noted above, the terms "insert," plug 18, and bushing 28 are used substantially interchangeably throughout the description. However, it is to be understood that the word "insert" is contemplated to refer to the plug 18, the bushing 28, and any equivalents and variations thereon. For example, it is contemplated that the insert may be a shaft or other component that is inserted into the hole 12.

When the temperature of the insert, such as the plug 18 or the bushing 28, is raised, it is contemplated that the insert may be heated. In one non-limiting embodiment, the insert may be permitted to rise to the operational temperature naturally. In another non-limiting example, heat may be applied to the insert via a heating element, etc. Heat may be applied via radiant, inductive, convective, and conductive methods without departing from the scope of the present invention. In still another non-limiting embodiment, the tool 32 may be used to heat the bushing 28 after insertion into the hole 12 in the composite material 10. In one further contemplated embodiment, an electrical current may be employed for heating, because any carbon particles in the insert are conductive, creating a resistance so that passing an electrical current will induce resistive heating.

In several non-limiting examples, it is contemplated that the insert may be milled, turned, shaped, grown, printed, or the like. With regard to printing, a number of three-dimensional printing techniques may be employed to create a material with embedded additives (i.e., a PEEK material with added carbon fibers). A large number of additive processes are potentially available. Some methods melt or soften material to produce the layers that form the final product (i.e., the plug 18 or the bushing 28). Methods that melt or soften the material include, e.g., selective laser melting ("SLM") or direct metal laser sintering ("DMLS"), selective laser sintering ("SLS"), fused deposition modeling ("FDM"), or fused filament fabrication ("FFF") Other methods involve the cure of liquid materials using different sophisticated technologies, e.g., stereolithography ("SLA"). With laminated object manufacturing ("LOM"), thin layers are cut to shape and joined together (e.g., paper, polymer, metal, etc.). Each method has its own advantages and drawbacks. Considerations in choosing a machine are generally speed, cost of the 3D printer, cost of the printed prototype, cost and choice of materials, and color capabilities, etc.

Figure 12:
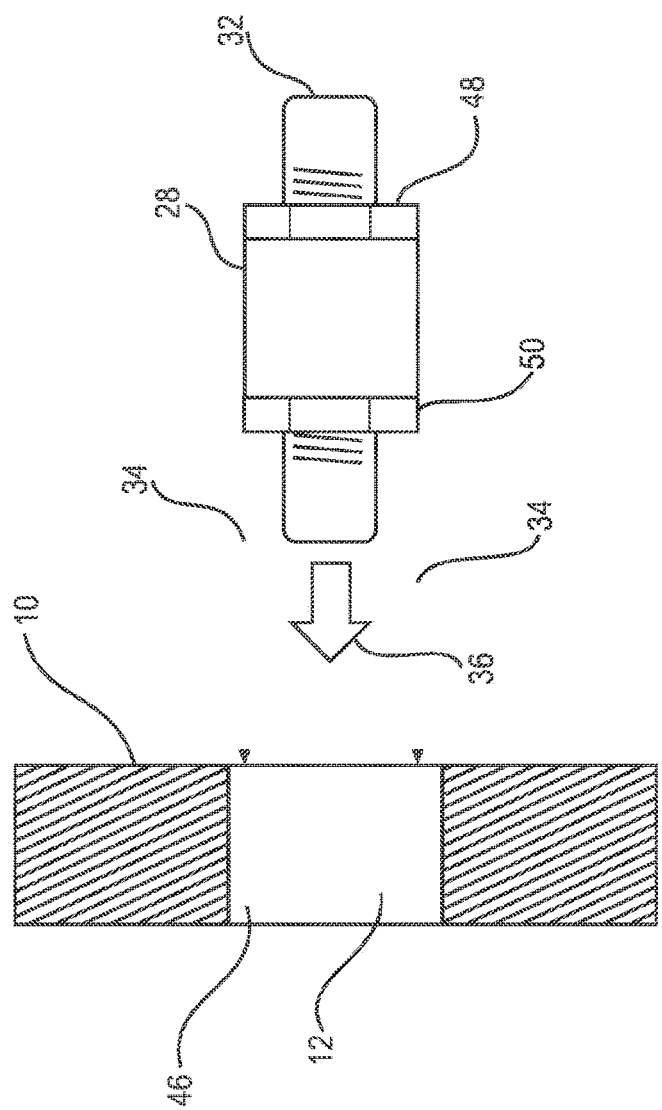
FIG. 12 is a graphical, side view of the composite material illustrated in FIG. 4, showing a variation of the tool illustrated in FIG. 7.

FIG. 12 is a graphical, side view illustration that is intended to be similar to the illustration in FIG. 7. In this view, the tool 32 has been provided with a first retainer 48 and a second retainer 50. The retainers 48, 50 are contemplated to retain the bushing on the tool 32 during the process of insertion of the bushing 28 into the hole 12. The retainers 48, 50 also may assist to position the bushing 28 until the interference is established between the bushing 28 and the hole 12.

Figure 13:
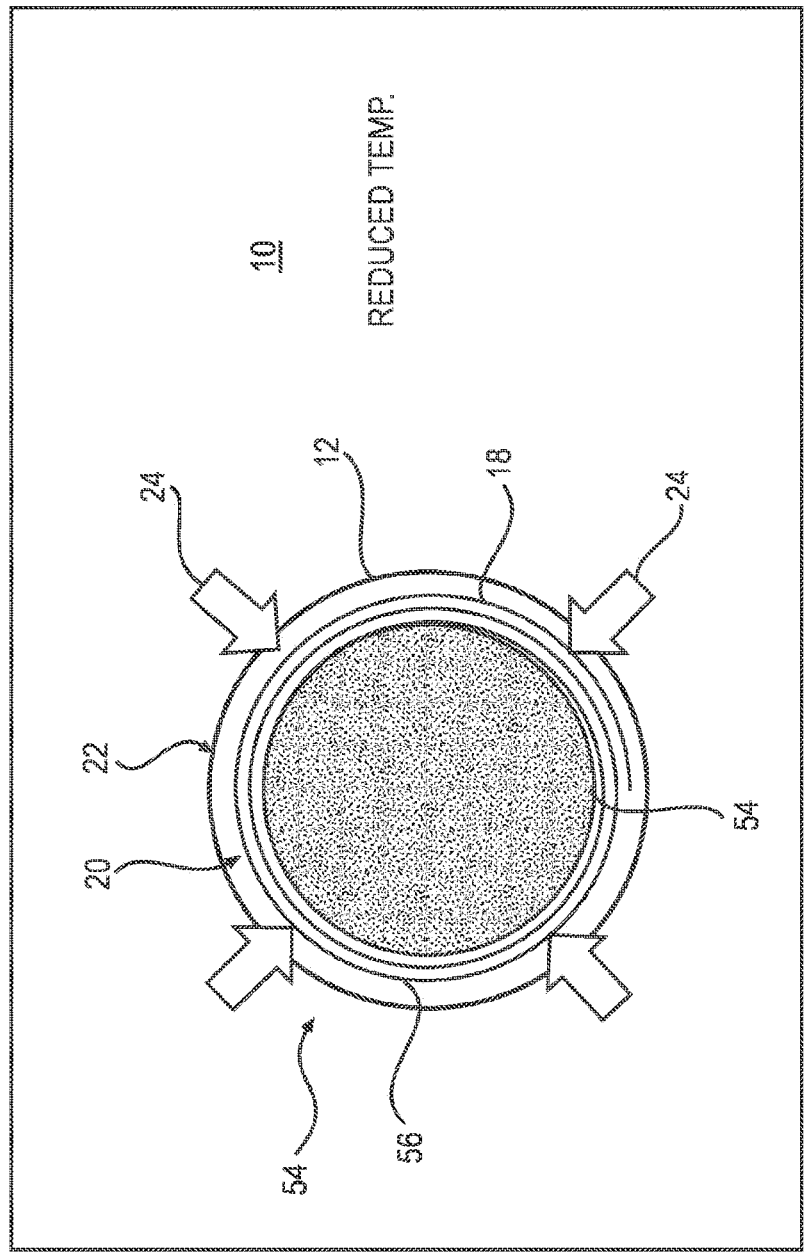
FIG. 13 is a graphical, top view of the composite material illustrated in FIG. 1, with a second embodiment of a plug, at a reduced temperature, inserted in a hole in the composite material.

FIG. 13 is a graphical, top view of the composite material 10 illustrated in FIG. 1, with a plug 52 at the reduced temperature inserted in the hole 12 in the composite material 10. In this embodiment, the plug 52 includes a solid central portion 54 surrounded by wrapped layers 56 of material. The central portion 54 and the wrapped layers 56 may be made of the same material or of different materials consistent with the disclosure herein. Among other advantages, it is contemplated that the wrapped layers 56 permit a user to adapt the perimeter of the plug 52 to meet any need.

Figure 14:
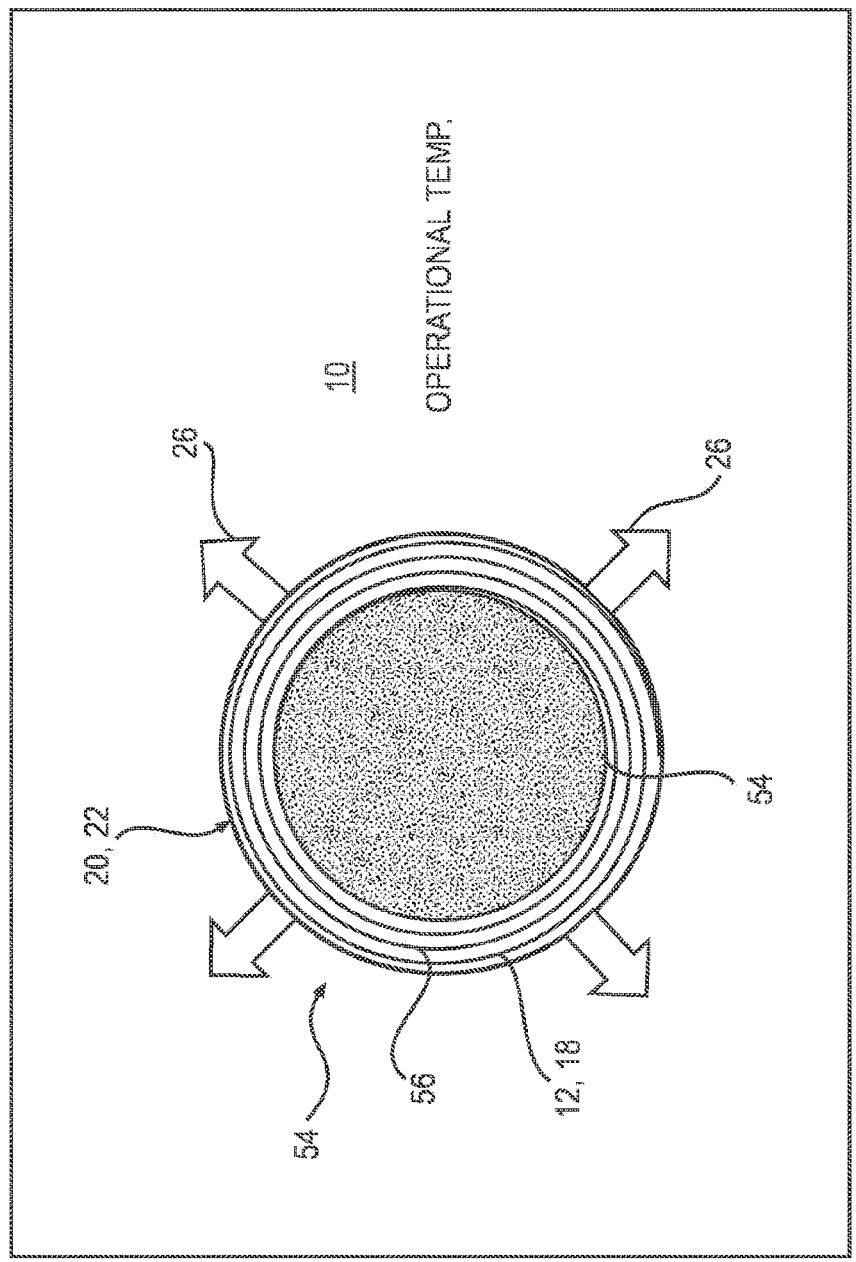
FIG. 14 is a graphical, top view of the composite material illustrated in FIG. 13, where the plug has expanded to fill the hole upon reaching an ambient temperature.

FIG. 14 is a graphical, top view of the plug 52 illustrated in FIG. 13. In this view, the size of the plug 52 has expanded, consistent with the second perimeter, to fill the hole, because the plug 52 has reached the operational temperature.

Figure 15:
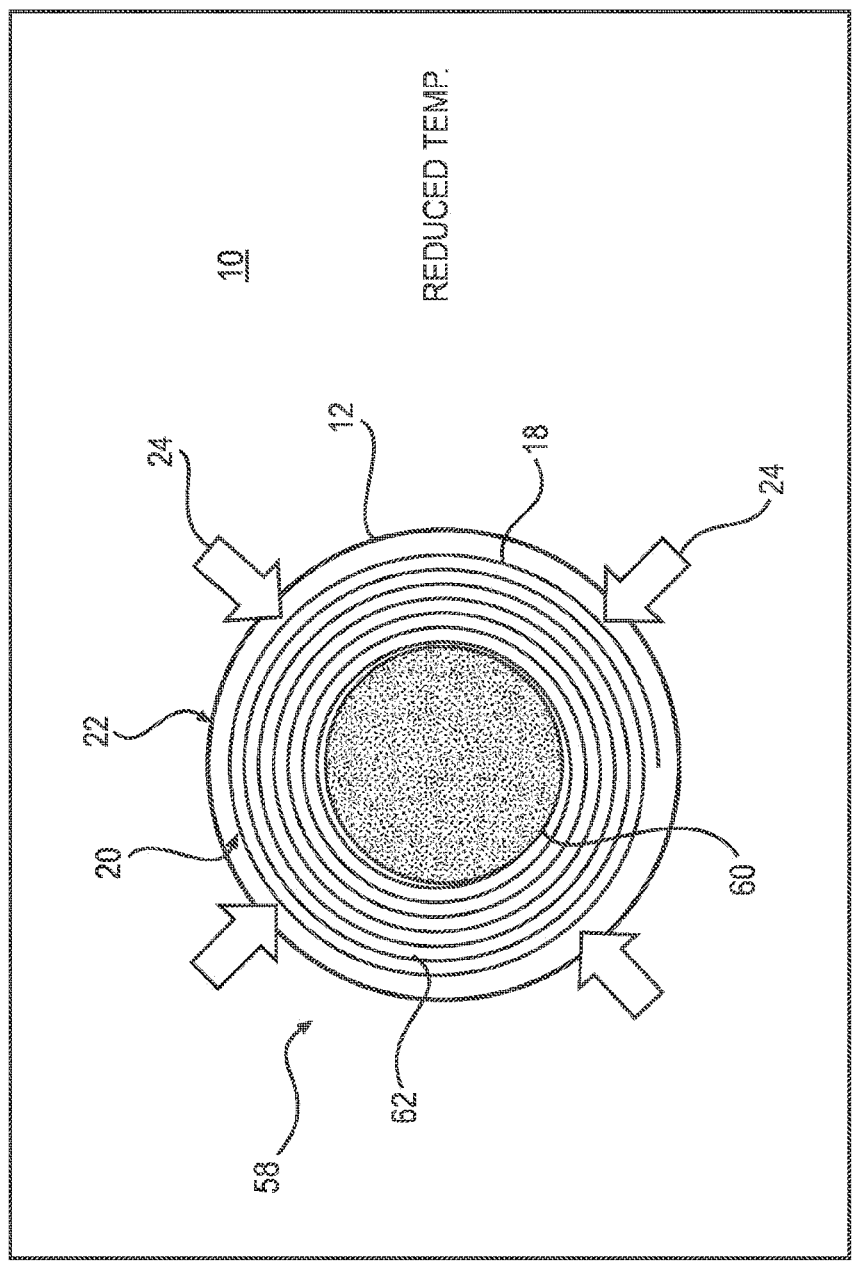
FIG. 15 is a graphical, top view of the composite material illustrated in FIG. 1, with a third embodiment of a plug, at a reduced temperature, inserted in a hole in the composite material.

FIG. 15 is a graphical top view of another plug 58 according to the present invention. Here, the central portion 60 has a smaller periphery than the central portion 54. In addition, the thickness of the wrapped layers 62 is greater than the thickness of the wrapped layers 56.

While any of the materials listed above may be employed for the central portion 54, 60 of the plugs 52, 58, it is contemplated that PEEK may be employed. The wrapped layers 56, 62, also may be any material, but PEEK may be a choice often employed.

The wrapped layers 56, 62 are contemplated to be selected from one or more films. Without limiting the present invention, films that may be used for the wrapped layers 56, 62 include monolayer films, co-extruded films, alloys and blends of ketones, resins, electrostatic discharge safe ("ESD") materials, fluoropolymers, imides, ketones, styrenics, sulfone based polymers, thermoplastics, plastics, and the like. The films may be made via extrusion, calendaring, lamination, or the like. As discussed above, the films may be doped with one or more additives including carbon, as discussed above.

As noted above, the embodiment(s) described herein are intended to be exemplary of the wide breadth of the present invention. Variations and equivalents of the described embodiment(s) are intended to be encompassed by the present invention, as if described herein.

What is claimed is:

1. A method for inserting an insert into a hole in a composite material made from a plurality of carbon fiber layers suspended in a resin matrix, the hole penetrating through the composite material, the method comprising:
    lowering a temperature of the insert to a reduced temperature at which a coefficient of thermal expansion of a material of the insert causes the insert to contract to a first perimeter;
    inserting the insert at the reduced temperature into the hole in the composite material; and permitting the temperature of the insert to increase from the reduced temperature to an operational temperature, wherein at the operational temperature, the coefficient of thermal expansion of the material of the insert causes the insert to expand to a second perimeter greater than the first perimeter so as to exert a radial force on walls of the hole so as to be retained within the composite material due to an interference between the insert and the composite material, the interference being such that structural load is transferred from the insert to the composite material and such that dislodging the insert at the operational temperature from the composite material results in damage to the composite material, wherein the insert is manufactured to within a typical tolerance of 0.0005" from its desired dimension, the insert comprising a PEEK material enhanced by carbon fibers.

2. The method of claim 1, wherein the interference avoids micro-cracking of the composite material.

3. The method of claim 1, further comprising:
selecting the material of the insert to possess a coefficient of thermal expansion that compliments the composite material to substantially avoid the generation of micro-cracks in the composite material when the insert is at the operational temperature.

4. The method of claim 1, wherein the operational temperature lies between −70° C. (−94° F.) and 160° C. (320° F.).

5. The method of claim 1, wherein the insert is at least one of a plug, a bushing, or a shaft.

6. The method of claim 1, wherein the PEEK material further comprises at least one of:
carbon powder, short carbon fibers, carbon black, carbon nanotubes, fiberglass, aramid fibers, graphene, silver, silver particles, nanoparticle silver, nickel, gold, copper, and semiconducting oxides.

7. The method of claim 6, wherein the semiconducting oxides comprise at least one of:
zinc oxide, tin dioxide, and titanium dioxide.

8. The method of claim 1, wherein lowering the temperature of the insert comprises:
immersing the insert in liquid nitrogen.

9. The method of claim 1, wherein lowering the temperature of the insert comprises:
exposing the insert to dry ice.

10. The method of claim 1, wherein a tool is employed when inserting the insert into the hole.

11. The method of claim 1, wherein at least a portion of a surface of the insert is at least one of knurled, grooved, sanded, or roughened to enhance engagement with a perimeter of the hole.

12. The method of claim 1, wherein the first perimeter of the insert is smaller than a perimeter of the hole at the reduced temperature.

13. The method of claim 12, wherein the second perimeter of the insert is coextensive with the perimeter of the hole at the operational temperature.

14. The method of claim 1, wherein the insert is a plug comprising:
a central portion; and
a plurality of wrapped layers surrounding the central portion.

15. The method of claim 14, wherein the central portion and the wrapped layers are constructed from different materials.

16. The method of claim 1, wherein the insert is manufactured to within a typical tolerance of 0.0001" from its desired dimension.

* * * * *